United States Patent [19]

Hahn

[11] 3,723,296

[45] Mar. 27, 1973

[54] HYDROCONVERSION OF PETROLEUM OILS

[75] Inventor: Frederick K. Hahn, Port Arthur, Tex.

[73] Assignee: Texaco, Inc., New York, N.Y.

[22] Filed: Aug. 16, 1971

[21] Appl. No.: 172,259

[52] U.S. Cl. .................................208/89, 208/59
[51] Int. Cl. .............................................C10g 23/00
[58] Field of Search................................208/89, 59

[56] References Cited

UNITED STATES PATENTS

| | | | |
|---|---|---|---|
| 3,338,819 | 8/1967 | Wood | 208/89 |
| 3,506,568 | 4/1970 | Annesser et al. | 208/89 |
| 3,598,719 | 8/1971 | White | 208/59 |

Primary Examiner—Delbert E. Gantz
Assistant Examiner—James W. Hellwege
Attorney—Thomas H. Whaley et al.

[57] ABSTRACT

In a dual catalyst system such as a petroleum oil hydrotreating - hydrocracking combination in which the first reaction zone is used to control the amount of catalyst deactivant passing into the second reaction zone, and the second reaction zone is a hydroconversion zone the temperature differential between the end-of-run temperature of each catalyst is maintained throughout the on-stream period and the reaction temperatures are regulated to obtain the desired amount of conversion.

13 Claims, No Drawings

HYDROCONVERSION OF PETROLEUM OILS

This invention relates to the conversion of hydrocarbons. More particularly, it is concerned with the catalytic conversion of hydrocarbons using two catalysts in series in which the first catalyst is directed to reducing the amount of materials in the feed which are deleterious to the activity of the second catalyst or to converting them into materials which have less or no undesirable effects. In a specific embodiment it is directed to the conversion of heavier petroleum hydrocarbons such as gas oils into lighter petroleum hydrocarbons such as motor and jet fuels using a two catalyst system in which materials which are deleterious to the activity of the second catalyst are removed or converted by the first catalyst to less deleterious materials.

It is customary in petroleum refining to carry out various hydrogenation reactions in the presence of a catalyst. However, frequently there are materials present in the charge stock which have a harmful effect on the catalyst. It is therefore necessary, for prolonged operation, either to remove these materials or to convert them to materials which have less or no undesirable effects. For example, in the hydrocracking of petroleum oils the catalyst activity is impaired by the presence of organic nitrogen compounds in the feedstock. However, hydrocracking catalysts containing zeolitic compounds in the support, although somewhat susceptible to deactivation by organic nitrogen compounds, are quite resistant to deactivation due to the presence of ammonia in the feed. Although ammonia tends to suppress the activity of zeolite hydrocracking catalysts somewhat, the effect is reversible simply by removing the ammonia, and does not increase with time. Consequently, it has become conventional to pretreat the feedstock to a hydrocracking unit by contacting it in the presence of hydrogen with a hydrotreating catalyst under conditions to convert the organic nitrogen compounds to ammonia and to pass the entire effluent from the hydrotreating zone to the hydrocracking zone. In such a procedure, the feed, usually virgin gas oil, coker gas oil, or catalytic cycle gas oil, is contacted at elevated temperature and pressure with hydrogen in the presence of a hydrogenation catalyst to convert the catalyst deactivant such as organic nitrogen or polycyclic aromatic compounds into ammonia or monocyclic aromatic compounds respectively. The effluent from the hydrotreating unit is then introduced into the hydrocracking unit at the desired temperature and pressure and the pretreated oil is subjected to hydrocracking therein.

Ordinarily the hydrotreating unit is operated at conditions to produce a product having a specified organic nitrogen content. For example, if it is desired to maintain the organic nitrogen content of the petroleum feed to the hydrocracking unit in the range of 40–50 ppm organic nitrogen, then the effluent from the hydrotreating unit is sampled periodically and analyzed to determine its organic nitrogen content. The reaction conditions in the hydrotreating unit are then adjusted to maintain the desired level. As the on stream period progresses, the catalyst activity diminishes usually due to the presence of carbon deposited thereon and to compensate for the decreased activity it becomes necessary to increase the severity of the reaction conditions generally by increasing the reaction temperature. Eventually, however, the catalyst bed is raised to a temperature above which it is no longer advantageous to operate and the unit is shut down for catalyst regeneration. This is done by purging the reactor with an inert gas to remove combustible materials such as residual hydrocarbon and hydrogen. The regeneration of the catalyst is then effected by introducing a gas containing a small amount of oxygen and the carbon is gradually burned off the catalyst under carefully controlled temperature conditions until the effluent gas shows that there has been essentially complete removal of carbon. The introduction of the oxygen-containing gas is then terminated, the reactor purged with an inert gas, hydrogen is introduced into the reactor, the catalyst is resulfided if desired and then brought to reaction temperature. The on stream period is then resumed by introduction of the hydrocarbon oil feed.

Similarly, in the operation of the hydrocracking unit, the operating conditions such as temperature and pressure are set to obtain the desired amount of conversion of the charge stock to lighter boiling materials. As in the case of the hydrotreating unit, the catalyst gradually loses its activity due to, among other things, the deposition of carbon thereon and to compensate for the decreased activity and to maintain the desired amount of conversion, the catalyst temperature is gradually raised. Eventually, a temperature is reached above which it is no longer desirable to operate and the hydrocracking unit is shut down for regeneration in a manner similar to the hydrotreating unit. Unfortunately, the operating ranges and deactivation rates of the catalysts are different and seldom, if ever, does it occur that both the hydrotreating and hydrocracking catalysts require regeneration at the same time. Usually, it is necessary to shut down the entire process while the catalyst in one unit is on regeneration and subsequently to shut down the entire process while the catalyst in the other unit is being regenerated. This means that frequently although one unit is still capable of being operated, the entire process is shut down for the regeneration of the catalyst in the other unit. This is an uneconomical method of operation.

It is, therefore, an object of the present invention to operate a two-catalyst hydrocarbon conversion process more efficiently than heretofore. Another object is to operate a two-stage catalyst conversion process so that the catalysts reach their end-of-run temperature substantially simultaneously. Another object is to maintain substantially the same average temperature differential between the two catalyst beds. Still another object is to reduce the non-productive downtime of a two-catalyst hydroconversion process. These and other objects will be obvious to those skilled in the art from the following disclosure.

According to our invention, in a hydrocarbon conversion process which is conducted using two catalysts in series and in which the first catalyst is a pretreating catalyst for controlling the amount of catalyst deactivant entering the second stage, and the second catalyst is a conversion catalyst, the operation is improved by maintaining substantially constant a predetermined average catalyst bed temperature differential between the first and second catalyst beds and controlling the catalyst bed temperatures by the amount of conversion effected in the second stage.

Although the process is applicable to several types of hydrocarbon conversion processes, it is best described in a specific embodiment, as for example, the hydrocracking of gas oils to motor and jet fuels.

To establish the operation of the process of our invention, the end-of-run temperature for each catalyst is determined and the temperature differential between these end-of-run temperatures is maintained substantially constant throughout the on stream period. For example, if the end-of-run temperature for the second or hydrocracking stage catalyst is 745° F. and for the hydrotreating catalyst is 775° F. then a temperature differential of approximately 30° F. is maintained between the catalyst beds throughout the on stream period. Ordinarily the end-of-run temperatures are selected basis the changes in product distribution and/or product quality that occur as the reaction temperature is increased to compensate for catalyst aging. Generally, as the temperature is increased the product distribution will become lighter, i.e. larger amounts of light hydrocarbons such as methane, ethane, and propane will be produced while the yields of jet fuel and heavy naphtha will be decreased. Also, the aromatic concentration in the products will generally increase as temperature is increased. The end-of-run temperature is then chosen as the temperature above which the product distribution is determined to be unacceptable, or possibly when hydrocracking to produce jet fuels or diesel fuels, the temperature above which the aromatic content of the product is unacceptable. This temperature can be determined experimentally. Occasionally, particularly in commercial units, the end-of-run temperature may be set basis design consideration, e.g., the temperature at which heater and/or heat exchanger fouling becomes unacceptable.

In the practice of our invention, if two reactors are used the on-stream period is inaugurated by introducing the hydrocarbon charge with hydrogen into the first reactor and passing the effluent from the first reactor through the second reactor at the predetermined conditions of pressure, space velocity and hydrogen rates. The catalysts may be preheated to substantially operating conditions prior to the introduction of the reactant stream. The catalyst bed temperatures are gradually increased while maintaining the proper temperature differential therebetween until the desired amount of conversion is obtained in the second stage. In the case of a gas oil feed, this may be for example a conversion of 50-100 percent to jet fuel and lighter boiling material. The reaction conditions are then stabilized. The temperature in the second stage may be higher or lower than would ordinarily be used in the prior art hydrocracking processes to process a feed having the same content of catalyst deactivant. For example, if in the prior art processes, it has been customary to maintain the organic nitrogen feed of the hydrocarbon charge to the second zone at between 40 and 50 ppm nitrogen, the starting temperature of the first stage may actually produce a feed to the second zone having a nitrogen content of between 10 and 20 ppm. However, this will be compensated for by maintaining the second conversion zone temperature at below what would ordinarily be the start of run temperature for the particular catalyst and feed stock. Since the feed to the hydrocracking unit is lower in catalyst deactivant, the same amount of conversion can be obtained at lower temperature than with a feed containing, for example, between 40 and 50 ppm nitrogen. Thus, once the processing conditions have been established, the entire process is governed by the temperature of the second catalyst bed necessary to obtain and maintain the desired amount of conversion.

As the conversion drops off because of loss of activity of the catalyst, the temperature in both reactors in increased. This increases both the conversion in the second reactor and also the amount of catalyst poison removal in the first reactor. If the first reactor is being operated at too low a temperature thereby permitting an unduly high amount of nitrogen to be introduced with the feed to the second stage this will affect the activity of the second stage catalyst and reduce the amount of conversion. By raising the temperature in both reactors slightly, the conversion of the organic nitrogen to ammonia in the first reactor will be increased, thereby reducing the amount of organic nitrogen going to the second reactor which in turn results in increased conversion. If the conversion increases beyond the desired level, a cutback in the temperature in both the first and second reactors will permit more deactivant to pass from the first reactor to the second reactor which coupled with the lower temperature in the second reactor will result in reduced activity of the second catalyst with a return of the conversion in the second reactor to the desired level.

Although in the preceding paragraphs, the process has been described as being carried out with each bed of catalyst situated in its own reactor vessel, it is possible to have both catalyst beds in the same reactor vessel. Whether the system contains only one reactor vessel or two reactor vessels, the greatest advantage is obtained if the entire effluent from the first catalyst bed is sent to the second catalyst bed although in some instances particularly where the charge to the first catalyst has an extremely high deactivant content it may be preferred to remove a portion of the reactant gas stream between beds. Preferably the reactant stream is passed downflow through fixed beds of particulate catalyst. However, it is possible to have countercurrent hydrogen-oil flow or to flow the reactants upwardly through a fixed or fluidized bed of catalyst.

By following our procedure, it is no longer necessary to sample the effluent from the hydrotreating unit periodically and to determine analytically the nitrogen content of the hydrocarbon feed to the hydrocracking unit. The process conditions are controlled simply by the amount of conversion effected in the second stage which can easily be determined by a method as simple as reading a gauge.

The process of this invention is applicable to various petroleum fractions such as naphthas, kerosenes, virgin gas oils, cycle gas oils, vacuum gas oils, residua, shale oil, tar sand oil and the like.

The hydrogen used in the process of our invention need not necessarily be pure. The hydrogen content of the hydrogenating gas should be at least about 60 percent and preferably is at least about 75 percent by volume. Suitable sources of hydrogen are catalytic reformer by-product hydrogen and hydrogen produced either by the partial combustion of hydrocarbonaceous material or steam reforming of light hydrocarbons followed by shift conversion and $CO_2$ removal. Hydrogen rates are expressed in terms of standard cubic feet per barrel of normally liquid charge to the reactor, viz. SCFB.

The catalyst used in the hydrotreating reactor should have good hydrogenating activity. Suitable catalysts comprise a hydrogenating component as for example the oxide or sulfide of cobalt, nickel, iron, molybdenum, tungsten, chromium, vanadium and mixtures thereof on a support such as silica, alumina, zirconia, magnesia and mixtures thereof used as such or in conjunction with zeolites not necessarily of reduced alkali metal content. Preferred catalysts comprise nickel tungsten on boria-promoted alumina and nickel molybdenum on activated alumina. The hydrogenating component should be present in an amount between about 5 and 40 percent by weight based on the catalyst composite. Catalysts containing 6 percent nickel and 20 percent tungsten or 5 percent nickel and 15 percent molybdenum have been found satisfactory.

The temperature within the hydrotreating zone is maintained between 300° and 900° F., preferably between 400° and 800° F. Pressure in the hydrotreating zone is substantially the same as that in the hydrocracking zone, taking into consideration the normal pressure drop required for the flow of materials through the system. Hydrogen should be introduced at a rate of at least 1,000 SCF per barrel of feed, a preferred range being from 3,000 to 15,000 SCFB. The catalyst bed in the hydrogenating reactor should be of a size sufficient to permit liquid hourly space velocities of 0.2–10 volumes of hydrocarbon liquid per volume of catalyst per hour. Preferably the LHSV is between 0.5 and 5.

The catalyst used in the hydrocracking stage of our process contains two components, a hydrogenating component supported on a cracking component. The hydrogenating component comprises a Group VIII metal such as platinum, palladium, iron, cobalt and nickel or compound thereof used alone or in conjunction with a Group VI metal such as molybdenum and tungsten or compound thereof. Particularly suitable hydrogenating components are palladium or nickel and tungsten in sulfide form.

The cracking component of the catalyst comprises a modified crystalline zeolite or a mixture of a modified crystalline zeolite and at least one amorphous inorganic oxide, the modified zeolite being present in an amount between about 8 and 90 percent by weight. Suitable amorphous inorganic oxides are those displaying cracking activity such as silica, alumina, magnesia, zirconia and beryllia which may have been treated with an acidic agent such as hydrofluoric acid to impart cracking activity thereto. A preferred mixture of amorphous inorganic oxides comprises silica-alumina in a proportion ranging between 60–90 percent silica and 10–40 percent alumina.

The modified zeolite portion of the cracking component has uniform pore openings of from 6–15 Angstrom units, has a silica-alumina ratio of at least 2.5, e.g. 3–10, and has a reduced alkali metal content. The modified zeolite may be prepared by subjecting synthetic zeolite Y to ion exchange by contacting the zeolite several times with fresh solutions of an ammonium compound at temperatures ranging between about 100° and 250° F. until it appears that the ion exchange is substantially complete. The ion exchanged zeolite is then washed to remove solubilized alkali metal and dried at a temperature sufficiently high to drive off ammonia. This converts the zeolite Y to the hydrogen form and reduces the alkali metal content to about 2–4 weight per cent. The ion exchanged zeolite is then calcined at a temperature of about 1,000° F. for several hours. After cooling, the ion-exchanged calcined zeolite is subjected to additional ion exchange by contact several times with fresh solutions of an ammonium compound and again washed and dried. This treatment results in a further reduction of the alkali metal content of the zeolite to less than 1 percent, usually to about 0.5 percent or less. It would appear that after the first calcination, it is possible to engage in further ion exchange with the removal of additional alkali-metal ions not removable in the initial ion exchange. Calcination at e.g. 1,000°–1,500° F. may take place here or it may be postponed until after the incorporation of the inorganic oxide and impregnation with the hydrogenating component, at which time the composite should be calcined. Whether the calcination is postponed or repeated, the final calcination temperature should not exceed 1,200° F.

Hydrocracking catalysts containing a hydrogenating component supported on a cracking component composed of at least one amorphous inorganic oxide and the twice ion exchanged, twice calcined zeolite have superior hydrocracking activity and additionally are more resistant to deactivation when brought into contact with nitrogen compounds and polycyclic aromatics. They also show good stability to steam. The hydrocracking catalyst should also be substantially free from rare earth metals and should have a rare earth metal content below 0.5 weight per cent, preferably below 0.2 weight per cent. It has been found that although rare earth metals are reputed to enhance the activity and stability characteristics of cracking catalysts, their presence in a hydrocracking catalyst is undesirable.

When the hydrogenating component of the hydrocracking catalyst is a noble metal, it should be present in an amount between 0.2 and 5.0 percent by weight based on the total catalyst composite. Preferably the noble metal is present in an amount between 0.5 and 2 percent. When the hydrogenating component comprises nickel in conjunction with tungsten, the nickel should be present in an amount between about 2 and 10 percent and the tungsten present in an amount between about 5 and 30 percent. Particularly suitable catalysts are those containing between 0.5 and 1.0 weight percent noble metal and those containing between 5 and 10 percent nickel and between 15 and 30 percent tungsten. Specific examples of suitable catalysts are those containing 0.75 weight per cent palladium or containing about 6 percent nickel and 20 percent tungsten on a support made up of about 22 percent modified zeolite Y, 58 percent silica and 20 percent alumina.

The hydrogenating component is deposited on the cracking component by impregnating the latter with a solution of a compound of the hydrogenating component. Such techniques are well known in the art and require no description here.

When used in the sulfide form the catalyst may be converted thereto by methods well known in the art such as by subjecting the catalyst at a temperature between about 400° and 600° F. to contact with a sulfiding agent, for example hydrogen containing 1–10 percent hydrogen sulfide or a carbon disulfide-oil mixture.

In the hydrocracking reactor, the temperature is generally maintained between about 500° and 900° F., the pressure between 200 and 10,000 psig, the liquid hourly space velocity between 0.2 and 10 volumes of oil per volume of catalyst per hour, and the hydrogen rate between 1,000 and 50,000 SCFB. A preferred temperature range is 600°–800° F. Advantageously, the temperature will to a small degree vary depending on the nitrogen content of the charge, the greater the nitrogen content, the higher the reaction temperature. The preferred pressure range is 500–3,000 psig. Other preferred conditions are a space velocity of 0.5–2 v/v/hr. and a hydrogen rate of 3,000–15,000 SCFB.

The following example is given for illustrative purposes only.

The charge in this example is a light cycle gas oil having the following characteristics:

TABLE I

| | |
|---|---|
| Gravity, °API | 31.3 |
| ASTM dist. °F. | |
| IBP – 5% | 324–371 |
| 10–20% | 429–451 |
| 30–40% | 479–495 |
| 50% | 509 |
| 60–70% | 526–541 |
| 80–90% | 558–580 |
| 95–EP | 594–614 |
| Total nitrogen, ppm. | 63 |
| Basic nitrogen, ppm. | 28 |
| Sulfur, wt. % | 0.29 |
| Polycyclic aromatics, wt. % | 21.1 |
| Total aromatics, wt. % | 42.6 |

The first stage catalyst is composed of 2.2 wt. percent nickel and 10.0 wt. percent molybdenum in the form of the oxides and the balance is alumina. The second stage catalyst contains 5.8 wt. percent nickel and 19.4 wt. percent tungsten also in the form of the oxides, supported on a base composed of 22 percent decationized zeolite Y, 21 percent alumina and 57 percent silica. Prior to start-up, the catalysts in both reactors are sulfided by charging a light petroleum fraction, containing added $CS_2$ sufficient to bring its sulfur content to 1.0 wt. percent sulfur, at a temperature of 400° F. until the catalysts are sulfided. Sulfiding is then completed at 600° F. The end-of-run temperatures for the first and second stage catalyst are determined to be 750° and 720° F. respectively, a temperature differential of 30° F. The on-stream period is commenced by introducing the charge in the presence of 5,000 SCFB hydrogen at a space velocity (volumes of oil per volume of catalyst per hour) of 2 into the first reactor and then passing the entire effluent from the first into the second reactor where the space velocity is 1.16. Outlet pressure from the second reactor is 1,300 psig. At a second reactor temperature of 652° F. the desired complete conversion to 525° F. and lighter material is obtained. The temperature in each reactor is gradually raised while holding the predetermined temperature differential to maintain complete conversion. The product quality is tabulated below:

TABLE 2

| | |
|---|---|
| Jet Fuel (325°–525°F.) | |
| Gravity, °API | 42.0 |
| Aromatics, vol. % | 14.7 |
| Smoke point, mm. | 23 |
| 115°–235°F. naphtha | |
| Aromatics, vol. % | 1.9 |
| RON clear | 78.5 |
| RON + 3 cc. TEL | 95.5 |
| 235°–325°F. naphtha | |
| Aromatics | 6.9 |
| RON clear | 64.0 |
| RON + 3 cc. TEL | 85.7 |
| Product Yields, % fresh feed | |
| $C_1$—$C_3$ wt. % | 1.4 |
| $C_4$—$C_5$ vol. % | 17.5 |
| $C_6$—235° F. vol. % | 20.3 |
| 235°–325°F. vol. % | 22.4 |
| Jet Fuel, vol. % | 56.9 |
| Hydrogen consumption, SCFB | 1740 |

By maintaining the designated temperature differential between the catalyst beds the predetermined end-of-run temperature is reached by both units at the same time and the entire process is shut down for the simultaneous regeneration of both catalysts. Each catalyst may be regenerated separately or both catalysts may be regenerated by passing the regenerating gases serially through the catalyst beds.

The temperature differential is determined to a large extent by the amount of poison present in the feed to the first zone. When the nitrogen content is high, it may be more desirable to increase the end-of-run temperature of the first stage catalyst so that the temperature differential may be greater than in the case when the feed to the first unit has a lower nitrogen content. For example, if the feed to the first unit is relatively high in nitrogen, as for example, 200–2,000 ppm, then the temperature differential may be between 50° and 70° F. whereas if the nitrogen content of the hydrotreater feed is relatively low, for example, less than 100 ppm, then the temperature differential may be relatively low or possibly even non-existent, for example 0°–30° F. Generally, the end-of-run temperature of the hydrotreating catalyst and the hydrocracking catalyst will range between 700° and 800° F. It is also possible in some instances to operate the first stage at a lower temperature than the second stage.

Since both the hydrotreating and the hydrocracking reactions are over-all exothermic, there is a temperature rise across each catalyst bed. For example, the temperature rise across the hydrotreater catalyst bed may be as high as 70°–200° F. whereas, with the hydrocracking, the temperature rise across the individual catalyst beds is generally limited to 10°–50° F. in order to maintain good temperature control. For this reason, the catalyst bed temperatures mentioned above are the average bed temperatures. Since the inlet temperatures are lower than the outlet temperatures, the outlet temperature from the hydrotreater may be 50°–100° F. higher than the inlet temperature to the hydrocracking unit and the first reactor effluent must be cooled prior to its introduction into the second reactor. Advantageously, this is done by indirect heat exchange with the fresh feed.

I claim:

1. In a petroleum hydrocarbon conversion process which is conducted using two catalyst beds in series in which the first catalyst is a pretreating catalyst for controlling the amount of catalyst deactivant entering the second bed and the second catalyst is a conversion catalyst, the improved method of operation which comprises maintaining substantially constant a predetermined average catalyst bed temperature differential between the first and second catalyst beds and controlling the catalyst bed temperatures to maintain the desired rate of conversion in the second stage.

2. The process of claim 1 in which the first catalyst is a hydrotreating catalyst and the second catalyst is a hydrocracking catalyst.

3. The process of claim 1 in which the first and second reaction zones are maintained at substantially the same pressure.

4. The process of claim 1 in which the second catalyst comprises a noble metal.

5. The process of claim 1 in which both the first and second catalysts comprise a group VI metal or compound thereof and a group VIII metal or compound thereof.

6. The process of claim 1 in which the petroleum hydrocarbon feed is a gas oil and the second stage effects a conversion to jet fuel and lighter material of 50–90 volume percent.

7. The process of claim 1 in which the temperature differential is between 10° and 60° F.

8. The process of claim 2 in which the hydrotreating zone is maintained at a higher temperature than the hydrocracking zone.

9. The process of claim 1 in which the first catalyst comprises a member of the group consisting of cobalt, nickel and compounds thereof and a member of the group consisting of molybdenum and tungsten and compounds thereof.

10. The process of claim 1 in which the second catalyst comprises a member of the group consisting of nickel and palladium and compounds thereof.

11. The process of claim 1 in which both the first and second catalysts are regenerated simultaneously.

12. The process of claim 11 in which each catalyst is regenerated separately.

13. The process of claim 11 in which the regeneration is effected by passing the regeneration gases serially through the catalyst beds.

* * * * *